United States Patent [19]
Gold

[11] 3,872,487
[45] Mar. 18, 1975

[54] PHOTOGRAPHIC FILM ASSEMBLAGE AND APPARATUS
[75] Inventor: Nicholas Gold, Arlington, Mass.
[73] Assignee: Polaroid Corporation, Cambridge, Mass.
[22] Filed: July 30, 1973
[21] Appl. No.: 383,777

Related U.S. Application Data
[63] Continuation-in-part of Ser. No. 213,989, Dec. 30, 1971, Pat. No. 3,748,984.

[52] U.S. Cl. .................. 354/86, 354/178, 354/304
[51] Int. Cl. ......................................... G03b 17/52
[58] Field of Search .................. 95/13, 19, 22, 30; 250/468; 354/84, 85, 86, 301, 303, 304

[56] References Cited
UNITED STATES PATENTS

| 796,447 | 8/1905 | Peters | 95/30 |
|---|---|---|---|
| 3,283,682 | 11/1966 | Rice | 95/13 |
| 3,643,565 | 2/1972 | Bellows | 95/13 |
| 3,643,567 | 2/1972 | Douglas | 95/13 |
| 3,652,853 | 3/1972 | Williner | 250/468 |
| 3,727,533 | 7/1971 | Perl | 354/312 |

Primary Examiner—Samuel S. Matthews
Assistant Examiner—Alan Mathews
Attorney, Agent, or Firm—John S. Vale

[57] ABSTRACT

Photographic apparatus for use with a photographic film assemblage of the type including a film container holding a plurality of film units and having a withdrawal slot in one end thereof. The container is provided with a withdrawal slot light sealing arrangement in the form of a primary light sealing sheet and a secondary light sealing end cap which is movable from a closed light-blocking position to an open position permitting film units to be advanced through the withdrawal slot. The photographic apparatus includes a mechanicam for moving the end cap on the film container from the closed position to the open position.

17 Claims, 12 Drawing Figures

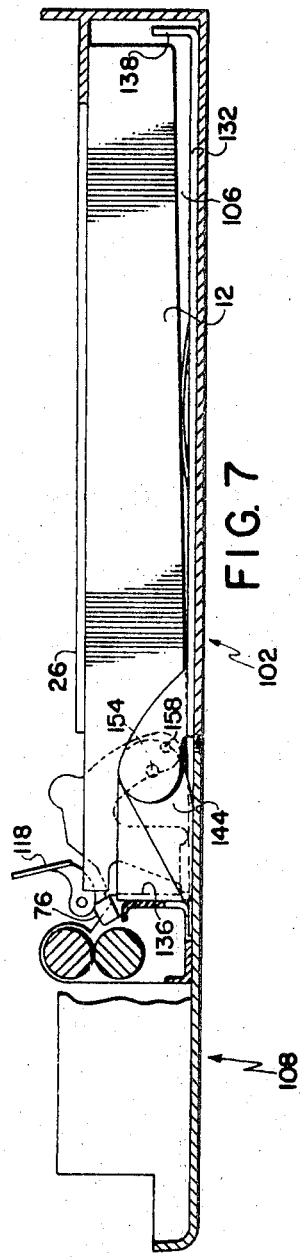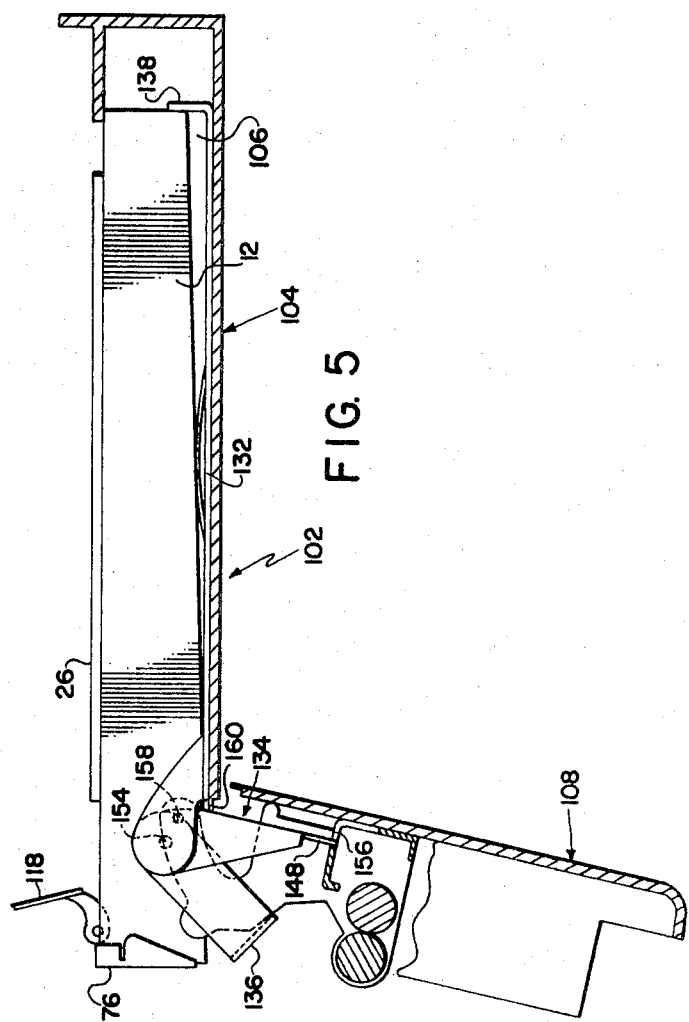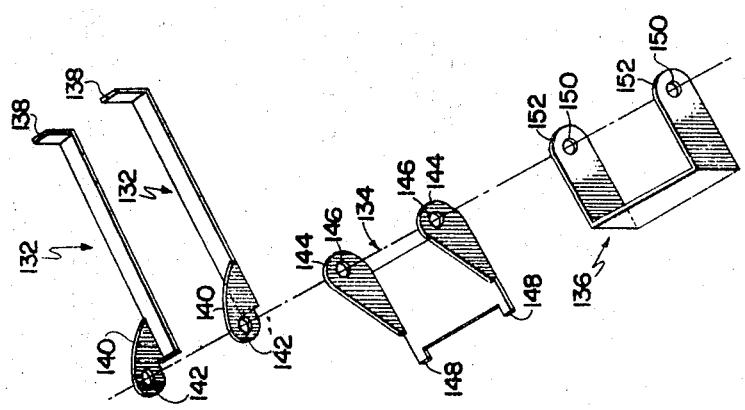

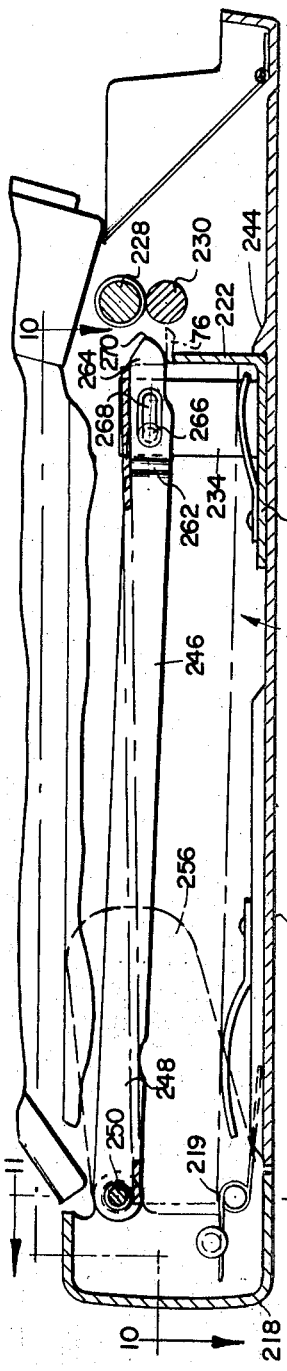
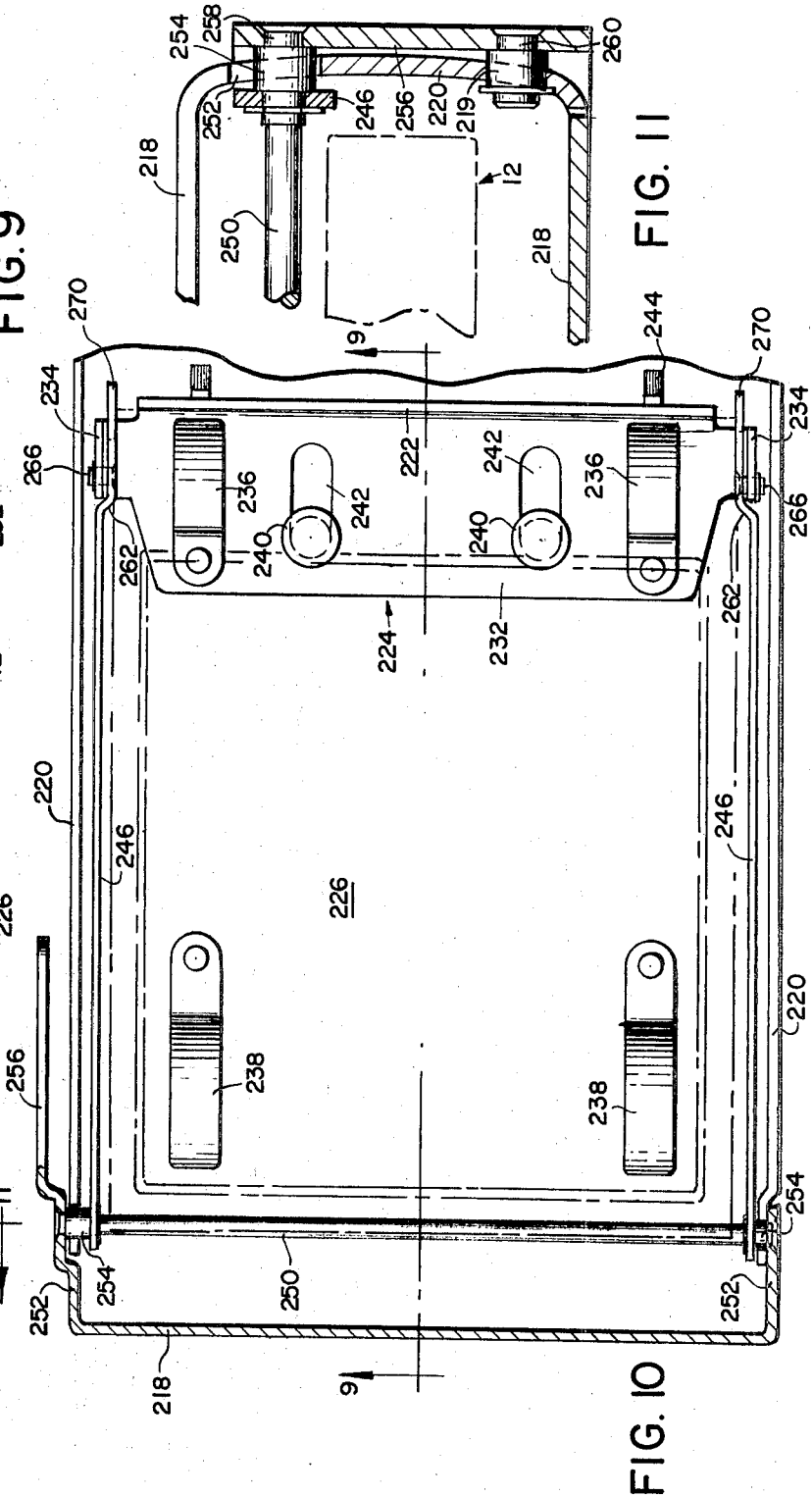

PHOTOGRAPHIC FILM ASSEMBLAGE AND APPARATUS

CROSS-REFERENCE TO RELATED APPLICATION

This application is a continuation-in-part of my copending application Ser. No. 213,989, filed Dec. 30, 1971 (now U.S. Pat. No. 3,748,984), entitled "Photographic Film Assemblage and Apparatus".

BACKGROUND OF THE INVENTION

1. Field of the Invention

The present invention relates to the field of photographic apparatus and photographic film assemblages for use therewith of the type including a container holding a plurality of film units, and more particularly to a light sealing arrangement for a withdrawal slot at one end of the container through which a film unit is adapted to be extracted therefrom.

2. Description of the Prior Art

The present invention relates to an improvement in a film assemblage of the general type disclosed in the U.S. Pat. No. 3,587,426, granted to Irving Erlichman on June 28, 1971. The assemblage comprises a film container, including a forward wall having a light-transmitting section or exposure aperture therein and an end wall cooperating with one end of the forward wall to define a withdrawal slot therebetween at one end of the container, in combination with a plurality of film units arranged within the container in stacked relation behind the forward wall with their photosensitive surfaces facing the exposure aperture. The forwardmost film unit in the stack is positioned adjacent the interior surface of the forward wall in alignment with the withdrawal slot at the end of the container. Such film assemblages are especially well suited for use in self-developing cameras of the type adapted to support the film container in position to locate the forwardmost film unit at an exposure plane within the camera and thereafter sequentially expose and advance the film units through the withdrawal slot into engagement with a processing assembly located adjacent thereto.

The above-mentioned patent sets forth a light-sealing arrangement for the withdrawal slot which consists of a sheet of flexible, resilient, opaque material disposed within the container between the end of the stack of film units and the end wall. The sheet is dimensioned such that it extends past the withdrawal slot in closing relation thereto and abuts the interior surface of the forward wall. As the forwardmost film unit is advanced through the withdrawal slot, it deflects the top end of the sheet abutting the forward wall to unblock the slot. Once the film unit has been extracted from the container, the inherent resiliency of the sheet material causes it to return to its blocking or light sealing position.

While this light sealing arrangement functions in a satisfactory manner once the container is located within the camera, it may be deficient in its ability to protect the film units from actinic light prior to and during insertion of the container into the camera.

The container is formed of a thin-gauged material, preferably a plastic such as polystyrene. As the user handles the container, it is possible that he will squeeze its side walls which depend from the forward wall and cause the end of the forward wall defining the withdrawal slot to bend or bow creating a space between the interior surface of the forward wall and the top edge of the opaque sheet thereby destroying the integrity of the light seal. Also, it is probable that the user will push on the end wall of the container during its insertion into the camera and possibly deflect the light seal from its blocking position.

Another problem associated with this particular light sealing arrangement is economic in nature. While the opaque light sealing sheet is quite inexpensive, the manufacturing cost associated with accurately positioning the sheet within the container is appreciable. If a space is left between the interior surface of the forward wall and the top edge of the sheet, the seal is ineffective. On the other hand, if the sheet is positioned too close to the forward wall, the top end may possibly bend around the forwardmost film unit and interfere with its being extracted from the container.

Therefore, it is desirable to provide a film assemblage of the type described with a light sealing arrangement for the withdrawal slot which is inexpensive to manufacture and is of such a construction that the seal will maintain its integrity while the film container is being handled by the user.

SUMMARY OF THE INVENTION

My copending application, Ser. No. 213,989, filed Dec. 30, 1971 (now U.S. Pat. No. 3,748,984) discloses a novel film assemblage and unique photographic apparatus having means therein for opening an end cap covering a film withdrawal slot in a film container forming part of such an assemblage. This continuation-in-part application is mainly directed to alternative embodiments of the photographic apparatus and end cap opening means.

The present invention provides an improved withdrawal slot light sealing arrangement including a primary light seal which is flexible in nature for sealing the slot when the film asemblage is located in its operative position within a camera, and a relatively stiff secondary light seal in the form of an end cap for light sealing the slot prior to and during the insertion of the assemblage into the camera and additionally serving as a protective cover for the primary light seal. The end cap is initially located in a closed position in covering relation to the primary light seal and the withdrawal slot and is configured to cooperate with structure within the camera so as to be automatically moved to an open position in response to inserting the film container into its operative position within the camera.

The primary light seal is attached to the exterior surface of the film container end wall and is of sufficient length to cover the withdrawal slot and extend above the exterior surface of the forward wall. This arrangement eliminates the need to accurately position the top edge of the primary light seal with respect to the forward wall of the container thereby lowering the manufacturing costs of the assemblage.

When the cap is located in its closed position, it covers the primary light seal and precludes the user from deflecting it out of its blocking position. Also, the cap extends over the exterior surface of the forward wall and substantially stiffens the end of the film container thereby reducing the possibility of distorting the forward wall during handling.

The present invention also provides photographic apparatus having structure therein which is adapted to engage and move the end cap from its closed position to its open position as the film container is moved to its operative position therein. In one embodiment, the photographic apparatus is configured to open the end cap in response to manually inserting the film container into its operative position within a film container receiving chamber. In another embodiment, the apparatus is provided with a film container insertion mechanism which is adapted to move a partially inserted film container into engagement with the structure for opening the end cap. Most advantageously, the film container insertion mechanism is operative in response to preparing the apparatus for operation, e.g., moving a pair of pressure applying members to their operative position.

In other embodiments, the photographic apparatus includes means for opening an end cap on the film container after the container has already been located at its operative position within the photographic apparatus. One variation of such an embodiment includes means on the apparatus for opening the end cap in response to closing a film container loading door on the apparatus.

Therefore, it is an objective of the present invention to provide a photographic film assemblage comprising in combination a film container including a forward wall and an end wall cooperating to define a withdrawal slot at one end of the container, a plurality of film units arranged in stacked relation within the container, primary means for light sealing the withdrawal slot including a flexible light opaque member and secondary means for light sealing the withdrawal slot including an end cap which is movable between closed and open positions.

It is another object of the present invention to provide a photographic film assemblage of the type described wherein the end cap is configured to cooperate with structure within a camera such that it is automatically moved from the closed position to the open position in response to inserting the film assemblage into an operative position within the camera.

It is yet another object of the present invention to provide photographic apparatus with which a film assemblage to the type previously described is adapted to be used.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 5 is an elevational view of a camera having a film container insertion mechanism associated therewith showing a film container partially inserted into the camera receiving chamber.

FIG. 6 is an exploded perspective view of the component parts of the film container insertion mechanism;

FIG. 7 is an elevational view of the camera shown in FIG. 5 with the film container located at its operative position;

FIGS. 9, 10, and 11 are related elevational views of portions of the camera of FIG. 8, with the end cap mechanism shown in its position after it has opened the end cap, these views are taken along indicated lines 9—9, 10—10, and 11—11.

DESCRIPTION OF THE PREFERRED EMBODIMENT

Figure 1:
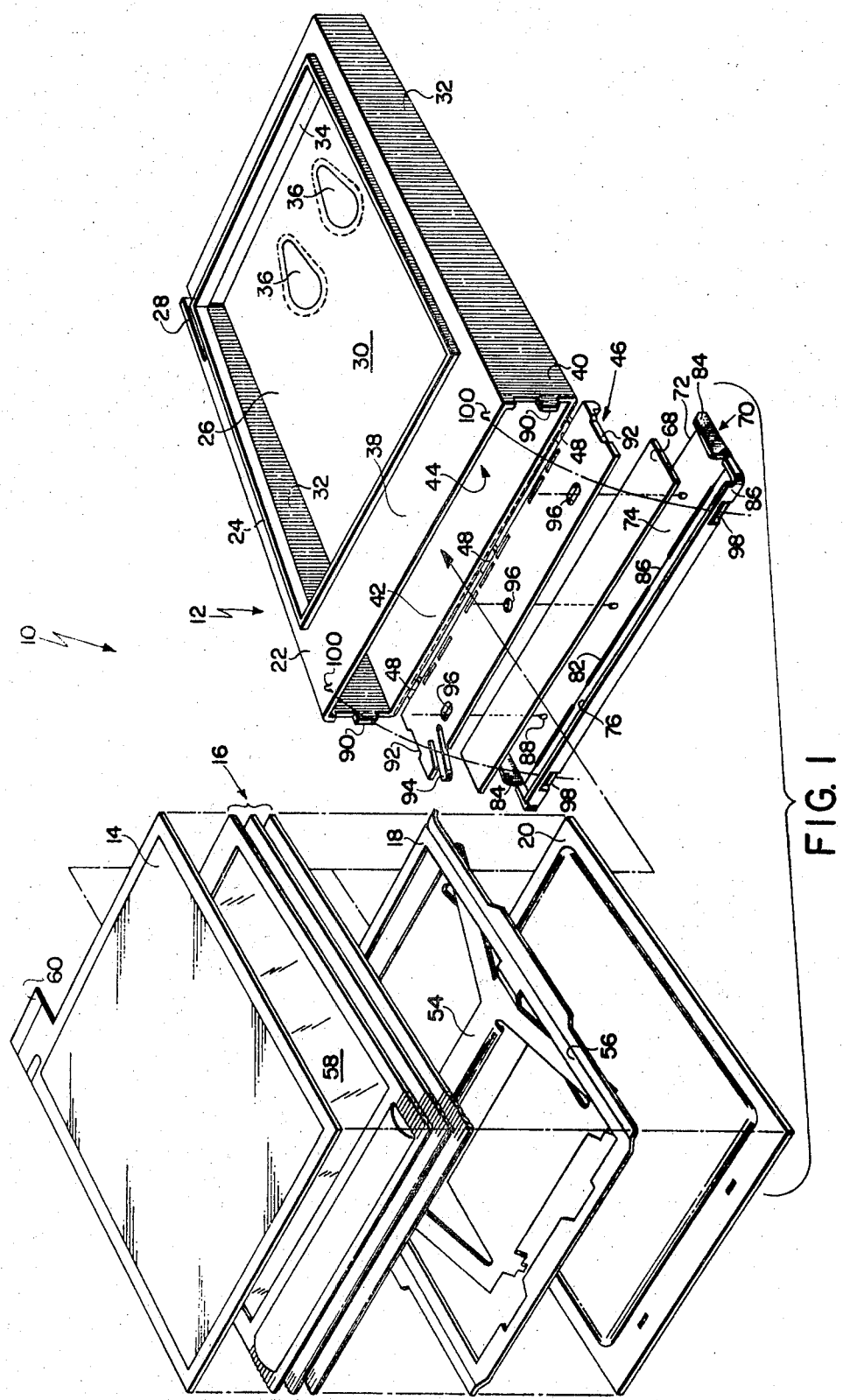
FIG. 1 is a perspective view of the film assemblage embodying the instant invention showing its component parts in expoloded fashion.

Referring now to FIG. 1 of the drawings, the component parts of a film assemblage or film pack of the type adapted to be inserted into a self-developing camera are shown generally at 10. These components include a film container 12, and a stack of photographic materials which includes a dark slide 14, a plurality of film units 16, a film support member 18, and an electrical battery 20.

Film container 12 is preferably formed of a light opaque thermoplastic material such as polystyrene and includes a forward wall 22 having an integrally formed upstanding rib 24 which defines the bounds of a generally rectangular light-transmitting section or exposure aperture 26 through which actinic radiation is adapted to pass to expose the forwardmost film unit 16. Forward wall 22 also has a second aperture 28 located near the trailing end of the container which provides access to the forwardmost film unit 16, subsequent to exposure, for extracting the exposed film unit from container 12. A rear wall 30 spaced from forward wall 22 by depending side walls 32 and trailing end wall 34, has a pair of teardrop shaped openings 36 therein for providing access to a pair of electrodes (not shown) on the underside of battery 20.

Figure 3:
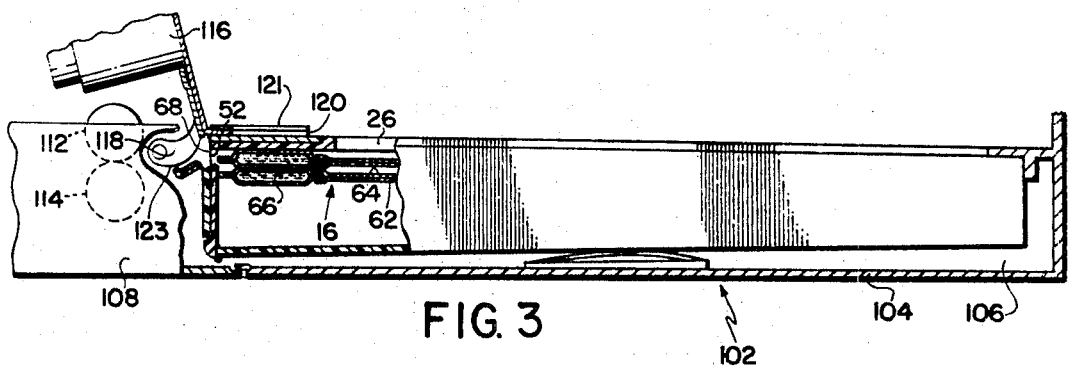
FIG. 3 is an elevational view, partly in section, of the film assemblage located in operative relation with a camera showing the end cap in its open position.

The leading ends 38, 40, and 42 of forward wall 22, side walls 32 and rear wall 30, respectively, cooperate to form a generally rectangular opening 44 at the leading end of container 12 through which the photographic materials are adapted to be inserted into the container. Thereafter, a leading end wall 46 which is preferably attached to the leading end 42 of rear wall 30 by means of integrally formed flexible hinges 48 is rotated 90° into abutment with the leading ends 40 of side walls 32 and the leading end 42 of rear wall 30 wherein it partially closes opening 44. As best shown in FIG. 3, once leading end wall 46 is located in its closed position, the upper edge 50 thereof cooperates with the leading end 38 of forward wall 22 to define a generally elongated withdrawal slot 52 therebetween through which the dark slide 14 and the film unit 16 may be sequentially extracted from container 12.

The photographic materials are preferably arranged in stacked relation within film container 12 in the order shown in FIG. 1. Battery 20 is provided for powering electrical components within the camera and is positioned over rear wall 30 with the electrodes in alignment with openings 36. Film support member 18 rests atop battery 20 and includes a generally H-shaped spring 54 coupled to a rectangular frame 56 which is dimensioned to engage the outer peripheral margins of the rearwardmost film unit 16 for spring loading the stack of film units 16 and dark slide 14 toward forward wall 22. Film units 16 are arranged in stacked relation with their photosensitive areas 58 facing exposure aperture 26 such that the forwardmost unit 16 is pressed against the interior surface of forward wall 22, once dark slide 14 has been removed, by the film support member 18 thus locating the forwardmost film unit 16 in position for exposure through aperture 26. As best shown in FIG. 3, the forwardmost film unit 16 is aligned with withdrawal slot 52 such that it may be moved in a plane parallel to forward wall 22 therethrough subsequent to exposure. Dark slide 14 is initially positioned between the forwardmost film unit 16 and the interior surface of forward wall 22 for light sealing apertures 26 and 28 prior to inserting the film assemblage into its operative position within the camera. As best shown in FIG. 1, dark slide 14 is approximately the same size as a film unit and is formed of any suitable opaque material such as cardboard, paper, or plastic and includes a flexible opaque skirt 60 at the trailing end which is adapted to pass around the end of the stack of film units in closing relation to aperture 28. Once the film assemblage has been located within the camera, dark slide 14 may be extracted from container 12 through the withdrawal slot 52 in the same manner as the forwardmost unit 16.

Each film unit 16 contains all of the materials for producing a positive photographic print by a diffusion transfer process. As best shown in FIG. 3, each of the film units 16 includes a photosensitive element 62, a superposed transparent image-receiving element 64 and a rupturable pod 66 coupled to one end of elements 62 and 64 containing a processing fluid. Subsequent to exposure, pod 66 is ruptured to dispense the processing fluid which is then spread in a thin uniform layer between and in contact with elements 62 and 64 to initiate the diffusion transfer process. Preferably, the processing fluid includes an opacifying agent such that the film unit may be advanced from the camera directly into an actinic environment without causing further exposure of the photosensitive element 62. For details of the construction of film unit 16, reference may be had to the copending application of Edwin H. Land et al., Ser. No. 5,799, filed on Jan. 26, 1970 (now U.S. Pat. No. 3,619,192) as a continuation-in-part of application Ser. No. 622,286, filed Mar. 10, 1967 (now abandoned) and assigned to the same assignee as the instant invention.

As noted earlier, apertures 26 and 28 in forward wall 22 are light sealed by dark slide 14, and apertures 36 in rear wall 30 of container 12 are covered by battery 20. The remaining aperture in container 12, namely withdrawal slot 52, is provided with a light sealing arrangement which includes a primary light seal for blocking withdrawal 52 when the assemblage is operatively positioned within the camera and a secondary light seal for light sealing slot 52 and protecting the primary light seal when the film assemblage is not located within the camera.

The primary light seal may take the form of a thin flexible sheet 68 of opaque material, for example, a sheet of Mylar having an opaque heat sensitive coating thereon. In the preferred embodiment, flexible sheet 68 is heat sealed to the exterior surface of leading end wall 46 and is dimensioned to extend upwardly therefrom beyond the exterior surface of forward wall 22 such that it covers withdrawal slot 52 (See FIG. 3). The secondary light seal preferably is in the form of an end cap member 70 which is adapted to be secured to the leading end of container 12 in overlying relation to flexible sheet 68 and in closing relation to withdrawal slot 52 (See FIGS. 1 and 2).

End cap member 70 is preferably formed of the same thermoplastic material as the main body of container 12 and includes a planar wall 72 which is divided into a lower end cap mounting section 74 and an upper end cap section 76 by a structurally weakened portion 78 extending between the lateral edges thereof. Weakened portion 78 effectively serves as an integrally formed hinge for allowing end cap section 76 to be rotated relative to mounting section 74. In the preferred embodiment, this weakened section 78 may take the form of four elongated recesses 80 for reducing the thickness of planar wall 72 to permit bending thereof and three elongated apertures 82 interdigitated with recesses 80 to further weaken section 78. End cap member 70 also includes a pair of integrally formed upturned side flanges 84 at the lateral ends of end cap mounting section 74 and a third integrally formed upturned flange 86 extending around the outer periphery of end cap section 76. Mounting section 74 also includes three integrally formed locating posts 88 projecting upwardly from the interior surface of wall 72 the function of which will be described hereinafter.

Subsequent to inserting the stack of photographic materials into container 12 through opening 44, leading end wall 46 is rotated 90° in a clockwise direction about hinges 48 to its closed position abutting the leading ends 40 of side walls 32 and the leading end 42 of rear wall 30. As best shown in FIG. 1, side walls 32 are provided with projections 90 which are adapted to extend through a pair of notches 92 at the lateral edges of leading end wall 46 for accurately locating the upper edge 50 of leading end wall 46 and an integrally formed flexible holdback finger 94 extending above edge 50 with respect to the interior surface of forward wall 22. The function of holdback finger 94 is to prevent more than one film unit at a time from being extracted through withdrawal slot 52.

Figure 2:
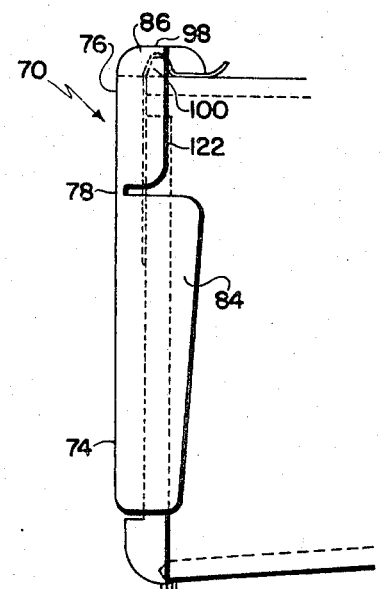
FIG. 2 is an elevational view of the leading end of the film container showing the light sealing end cap in its closed position.

As noted earlier, one end of the flexible sheet 68 is secured to the upper portion of the exterior surface of leading end wall 46 such that its opposite free end extends above the exterior surface of forward wall 22. End cap member 70 is positioned over the exterior surface of leading end wall 46 (See FIG. 2) with locating posts 88 extending through locating holes 96 in the leading end wall 46 for accurately locating end cap member 70 with respect to the leading end of container 12. Side flanges 84 are located in overlying relation to the exterior surface of the lower portion of side walls 32 and flange 86 overlies the exterior surface of the upper portion of side walls 32 and the leading end 38 of forward wall 22. As best shown in FIG. 2, the end cap section 76 of end cap member 70 holds the free end of flexible sheet 68 against the exterior surface of forward wall 22.

Once the leading end wall 46 and the end cap member 70 are located in the closed position shown in FIG. 2, ultrasonic energy may be applied to the container to weld the interior surface of leading end wall 46 to the leading ends 40 and 42 of side walls 32 and rear wall 30, and the interior surface of end cap mounting section 74 to the exterior surface of leading end wall 46 (below sheet 68) and the ends of side wall projections 90. It will be noted that the Mylar sheet 68 is effective to prevent the end cap section 76 from being welded to the forward wall 22.

In order to insure that the end cap section 76 remains in its closed position during handling of the film assemblage, an end cap latch may be provided. The latch may take the form of one or more recesses 98 in flange 86 which are adatped to receive integrally formed projections 100 extending upwardly from the exterior surface of leading end wall 22.

It will be apparent to one skilled in the art that the addition of end cap member 70 substantially increases the rigidity of the leading end of container 12. When end cap section 76 is located in its closed position, flange 86 restrains the forward wall 22 and prevents it from bowing outwardly should the user apply an excessive amount of pressure to the side walls 32 during handling. Also, end cap section 76 forms a protective cover over sheet 68 and holds its free end securely against the exterior surface of forward wall 42 to prevent it from being accidentally deflected. In this manner, end cap 76 functions as a secondary light seal for withdrawal slot 52.

Figure 4:
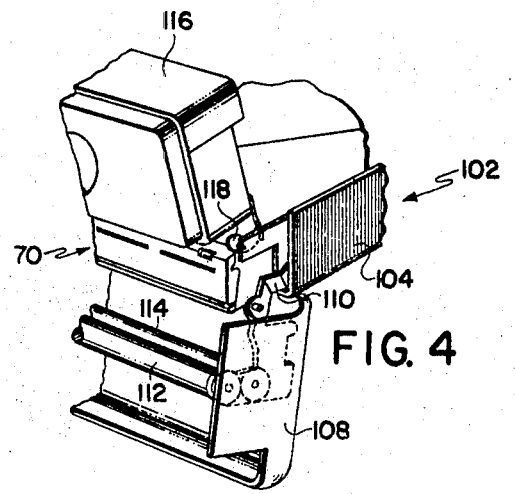
FIG. 4 is a perspective view of a portion of the film assemblage and camera illustrating the engagement of the end cap with a camera housing support member for moving the end cap from the closed position to the open position in response to inserting the film assemblage into the camera.

In use, film assemblage 10 is adapted to be inserted into a self-developing camera 102 of the type shown in FIGS. 3 and 4 and described in detail in copending application Ser. No. 102,775, filed on Dec. 30, 1970. Camera 102 comprises a plurality of housing sections including a first section 104 having a chamber 106 therein for receiving assemblage 10, a second section 108 pivotally coupled to one end of section 104 by means of a bracket 110 which also supports a pair of processing rollers 112 and 114, and a third section 116 pivotally coupled to section 104 by means of a pair of brackets 118 (only one of which is shown) which supports components of the camera's optical and exposure control systems.

Access for inserting film assemblage 10 into receiving chamber 106 is provided by rotating section 108 from its closed position shown in FIG. 3 to its open position shown in FIG. 4 to expose an open end of chamber 106 located adjacent the interface between sections 104 and 106.

Film container 12 is inserted, trailing end first, through the open end and is moved rearwardly (to the right as viewed in FIG. 3) to its operative position within camera 102 wherein exposure aperture 26 in the forward wall of container 12 is in registration with an exposure opening 120 formed in a support plate 121 within section 104. Also, when film assemblage 10 is operatively positioned within camera 102 electrical contacts (not shown) extend through openings 36 in rear wall 30 to couple battery 20 to the camera's electrical system, and a film advancing mechanism (not shown) extends through aperture 28 in forward wall 22 and engages dark slide 14.

As best shown in FIG. 4, mounting brackets 118 define a portion of the chamber opening and are dimensioned such that they extend into the path of travel of end cap flange 86 which extends outwardly from the exterior surface of sidewalls 32.

With film container 12 partially inserted into chamber 106 and approaching its operative position therein, brackets 118 engage the trailing edge 122 of flange 86. As film container 12 is moved past this point into chamber 106, brackets 118 prevent further linear rearward motion of end cap section 76 causing it to unlatch and pivot in a counterclockwise direction about weakened section 76. Brackets 118 are proveded with a curved lower camming surface 123 which flange 86 follows to pivot end cap section 76 to its fully opened position (See FIG. 3).

Once container 12 is fully inserted, section 108 is moved to its closed position thereby locating rollers 112 and 114 in position adjacent to withdrawal slot 52 for receiving the forwardmost film unit. It will be noted that when the secondary light seal, i.e., end cap section 76, is moved to its open position, it is spaced from and is out of alignment with withdrawal slot 52 and the path of travel of a film unit advancing therethrough. However, the primary light seal, sheet 68, remains in closing relation to slot 52 for preventing the exposure of film unit 16 by light passing between rollers 112 and 114.

In operation, dark slide 14 is extracted from container 12 by actuating an electronic control system within camera 102. Drawing power from battery 20, a film advancing mechanism (not shown) extending through container aperture 28 engages the trailing end of dark slide 14 and advances it to the left as viewed in FIG. 3. The leading end of dark slide 14 passes through withdrawal slot 52 and deflects the free end of sheet 68 outwardly permitting the leading end of dark slide 14 to advance into engagement with the processing rollers 112 and 114. Rollers 112 and 114 rotatably driven in a direction to cause the dark slide to pass therebetween to the exterior of camera 102. Once dark slide 14 has been extracted from container 12, the inherent resiliency of sheet 68 causes it to return to its blocking position. Upon a second actuation of the control system, the forwardmost film unit is exposed through the exposure aperture 26 in the forward wall of container 12 and is then advanced through withdrawal slot 52 and rollers 112 and 114. As the exposed film unit passes between rollers 112 and 114 they apply compressive pressure to pod 66 causing it to rupture and dispense the processing fluid which is then spread between and in contact with element 62 and 64 to initiate the diffusion transfer process.

Should it become necessary to remove film assemblage 10 from receiving chamber 106 before all of the film units 16 have been exposed, the end cap section 76 may be restored to its closed position to reseal slot 52 thereby protecting all of the remaining film units beneath the forwardmost film unit from further exposure.

It will be noted that the camera 102 shown in FIGS. 3 and 4 of the drawings is configured such that the user must manually move the film container 12 to its operative position within chamber 106. In other words, once the film container 12 is partially inserted into chamber 106 such that brackets 118 are in engagement with end cap flange 86, the user must apply pressure to the exterior surface of end cap mounting member 74 to cause the film container 12 to move into its operative position thereby unlatching and pivoting the end cap 76 to its open position.

An alternative embodiment of the camera 102 is shown in FIGS. 5 and 7. In this embodiment, the camera 102 further includes a film container insertion mechanism 130 for moving a partially inserted film container 12 into its operative position in response to preparing the camera for operation.

In a preferred embodiment, the film container insertion mechanism 130 may take the form of a pair of elongated slide members 132, an actuating plate 134, and an insertion member 136 (see FIG. 6).

Each of the slide members 132 includes an upturned flange 138 at one end thereof and an upturned flange 140 having a hole 142 therein at the opposite end thereof. Actuating plate 134 includes a pair of upturned flanges 144 at the lateral ends thereof, each having a hole 146 therein and a pair of tabs 148 depending from the leading edge thereof. Insertion member 136 is generally U-shaped and includes a pair of holes 150 near its ends 152.

As best shown in FIG. 5, slides 132, plate 134, and insertion member 136 are pivotally coupled to one another by a pair of pins 154 which extend through holes 142, 146 and 150. Slide members 132 are slideably mounted on a pair of guide tracks (not shown) mounted on the interior surface of the bottom wall of housing section 104. With housing section 108 in its open position, actuating plate 134 is disposed at approximately a 90° angle to slide members 132 and insertion member 136 is disposed at approximately a 45° angle to slide members 132.

Film container 12 is inserted through the open end of chamber 106 and is moved rearwardly until the trailing end wall 34 of the container bears against the flanges 138 at the ends of slide members 132. At this point brackets 118 engage the trail edge 122 of end cap 76.

It will be noted that tabs 148 on plate 134 are adapted to extend into recesses 156 in roller mounting bracket 110 for coupling actuating plate 134 thereto. Also, the flanges 144 of plate 134 are configured to frictionally engage the ends 152 of insetion member 136 such that when plate 134 pivots about pins 154 insertion member 136 is carried therewith.

In operation, housing section 108 is pivoted in a clockwise direction (as viewed in FIG. 5) about pivot points 158 causing actuating plate 134 to pivot in a clockwise direction, about pins 154, thereby carrying insertion member 136 such that it also pivots in a clockwise direction about pins 154 until it is aligned with the end cap mounting member 74.

Further rotation of housing section 108 toward its closed or operative position causes the pivot point of plate 134 at pins 154 to move rearwardly into chamber 106, moving slide members 132 and insertion member 136 rearwardly. As insertion member 136 moves rearwardly, it moves film container 12 into its operative position and causes brackets 118 to unlatch and pivot end cap 76 to its open position (see FIG. 7). Thus, camera 102 is provided with a film container insertion mechanism 130 which is operative in response to preparing the camera 102 for operation by moving housing section 108 and rollers 112 and 114 to operative position for inserting film container 12 into its operative position thereby causing end cap 76 to be moved from the closed position to the opened position.

In order to remove film container 12 from chamber 106, housing section 108 is pivoted in a counter-clockwise direction about pivot point 158. As plate 134 pivots in a counter-clockwise direction about pins 154 it bears against the leading edge 160 of the bottom wall of housing section 104 which acts as a fulcrum such that the pivot point at pins 154 moves forwardly out of the chamber 106. This causes slide member 132 to engage the trailing end of the film container at flanges 138 and carry it forwardly to the position shown in FIG. 7. Plate 134 also moves film insertion member to the position shown in FIG. 5 such that film container 12 may be grasped at its sidewalls 32 and removed from chamber 106. Thus, mechanism 130 also functions as a film container extractor.

One skilled in the art will appreciate that film container insertion and extraction mechanism 130 may also be used with film container of the type not including an end cap member for moving the film container into operative association with the battery contacts mounted in chamber 106 and disengaging the film container therefrom after all of the film units have been exposed and processed.

In the embodiments of the photographic apparatus shown in FIGS. 3, 4, 5, 6, and 7, the means for opening the end cap has been a pair of fixed brackets 118 which the film container 12 is moved relative to for moving the end cap section 76 from its closed position to its open position as the film container 12 is inserted into its operative position within a receiving chamber in the apparatus.

Alternatively, it is within the scope of the present invention to provide means within the apparatus that are mounted for movement relative to a film container supported at a fixed location within the apparatus for opening the end cap.

Such a photographic apparatus is shown in FIGS. 8, 9, 10, and 11 of the drawings in the form of a folding, self-developing, single lens reflex camera 200 shown in its extended and operative position.

Camera 200 is formed by a plurality of pivotally interconnected housing sections 202, 204, 206, and 208 and a cooperating light excluding bellows 210. Housing section 208 mounts an objective lens 212 which forms an image of the scene to be photographed on an internal focusing surface (not shown) in housing section 202. The image may be viewed by looking through a viewing device 214 mounted on housing section 206.

Base section 202 includes an internal, open ended (at the rear or trailing end of housing section 202) chamber 216 for receiving a film container 12. As best shown in FIGS. 8, 9, 10, and 11 a door 218 is pivotally coupled, at pivots 219, to side walls 220 of housing section 202, near the trailing end thereof, for movement between the open position shown in FIG. 8 wherein door 218 is out of alignment with an open end 221 of the chamber 216 to permit a film container 12 to be inserted therein and a closed position shown in FIG. 9 wherein door 218 is in closing relation to the chamber opening 221.

Camera 200 is distinguishable from the previously described camera 102 in that it is a "rear loading" camera as opposed to a "front loading" camera (102).

With door 218 in the open position, the film container 12 (shown in phantom lines) is inserted, leading end first, into the chamber 216 until the leading end of container 12 abuts an upstanding, forward, vertical wall 222 of a loading tray 224 slidably mounted on a bottom wall 226 of housing section 202 for movement towards and away from a pair of pressure applying rollers 228 and 230 mounted in the leading end of housing section 202 under housing section 208.

Sliding tray 224 includes a horizontal bottom wall 232, the upstanding vertical wall 222, and a pair of spaced upstanding sidewalls 234 (see FIG. 10). Mounted on horizontal wall 232, is a pair of springs 236, for engaging the underside of the leading end of film container 12 and urging it upwardly to locate the forward wall 222 of the film container 12 against an aperture plate (not shown) in housing section 202 thereby accurately positioning the forwardmost film unit 16 in the container 12 for exposure. A second pair of springs 238 may be provided on bottom wall 226 for urging the trailing end of the film container 12 upwardly in the same manner.

The upstanding sidewalls 234 of tray 224 are spaced apart to allow the leading ends of film container sidewalls 32 to be inserted therebetween.

As best shown in FIG. 10, loading tray 224 is guided for sliding movement over bottom wall 226 of housing section 202 by a pair of pins 240 which are coupled to wall 226 and extend upwardly through a pair of elongated slots 242 in bottom wall 232 of tray 224. As will be explained later in the disclosure, tray 224 is mounted for sliding movement between a first or retracted position shown in FIG. 8 and a second or fully inserted operative position of FIGS. 9 and 10 wherein upstanding forward wall 222 of tray 224 abuts an upstanding stop 244 on bottom wall 226 of housing section 202.

Figure 8:
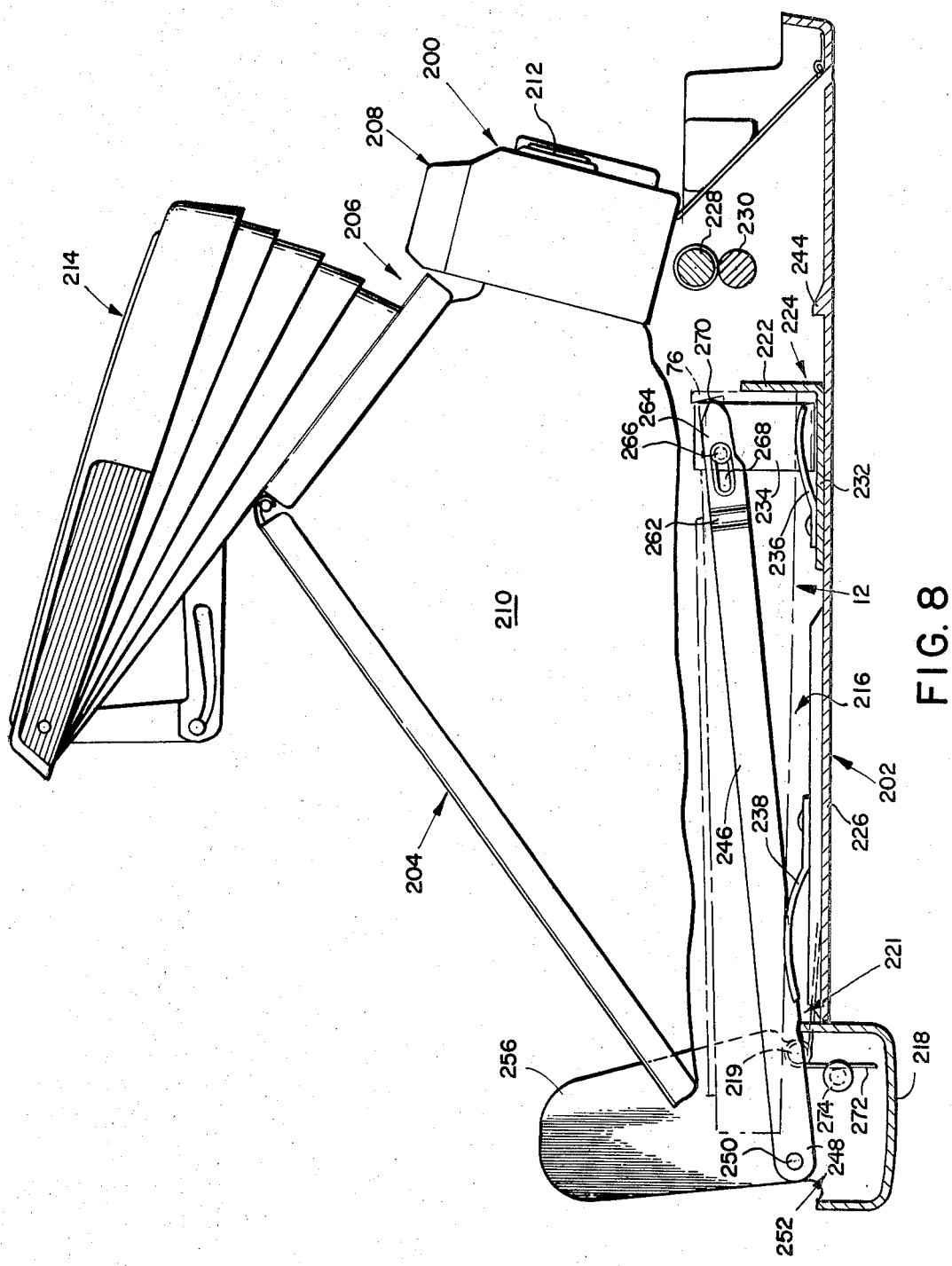
FIG. 8 is an elevational view, partly in section, of an alternative embodiment of a camera having a mechanism for opening an end cap on a film container in a receiving chamber of the camera, a portion of the end cap opening mechanism is shown to be in engagement with the end cap in preparation for opening the end cap.

The means for moving the film container end cap section 76 from its closed position to its open position include a pair of spaced (on either side of the side walls 32 of film container 12) elongated links 246 which are connected between rear door 218 and the upstanding sidewalls 234 of loading tray 224. As will be explained later, the leading ends of links 246 engage the outwardly extending portions or flanges 86 of the film container end cap section 76 when the film container 12 is inserted into loading tray 224 (in its retracted position) as is shown in FIG. 8. As door 218 is rotated in a clockwise manner towards its closed position, links 246 push the partially inserted film container 12 forwardly (to the right as viewed in FIG. 8) further into chamber 216. The film container 12, in turn, pushes loading tray 224 forwardly until it is stopped by stop 244. As the door 218 is further rotated towards its closed position, links 246 advance further forwardly and apply a sufficient force to end cap flanges 86, which extend outwardly from sidewalls 32 of the film container 12, to cause the end cap section 76 to rotate in a clockwise direction (as viewed in FIGS. 8 and 9) and move from its closed position to its open position.

When door 218 is opened, links 246 pull the loading tray 224 rearwardly to its retracted position so that the trailing end of the film container may be grasped by the user for easy removal from chamber 216.

Elongated links 246 are each pivotally connected near their trailing ends 248 to a shaft 250 which extends laterally across the inside of rear door 218 and is connected to side walls 252 of door 218 by a pair of bushings 254 mounted thereon.

In order to facilitate movement of door 218, it is preferably provided with a handle 256 which is attached to one side wall 252 of door 218 and is pivotally connected to side wall 220 of housing section 202 at the same pivot 219 as door 218.

As best shown in FIG. 11, handle 256 is fixedly connected to door sidewall 254 at bushing 254 by a pin 258 and is pivotally connected to sidewall 220 of housing section 202 by a pin 260 which is coupled to pivot 219. In FIG. 9, it will be seen that handle 256 is positioned along side wall 220 of housing section 202 when door 218 is in its closed position.

The link 246 shown in FIGS. 8 and 9 is the link on the far side of housing section 202, i.e., FIG. 9 is a view taken along line 9—9 of FIG. 10.

The links 246 extend forwardly into chamber 216 from shaft 250 between the sidewalls 220 of housing section 202 and the sidewalls 32 of a film container 12 partly inserted (as in FIG. 8) in chamber 216. Each link 246 may include an inward bend at 262 so that their respective leading ends 264 are adjacent the interior surfaces of their associated upstanding sidewalls 234 of loading tray 224.

Each link 246 is coupled to its associated sidewall 234 of tray 224 for sliding and pivotal motion relative thereto by inwardly extending pins 266 mounted on sidewalls 234 which extend through elongated slots 268 in links 246 near the leading ends 264 thereof.

In a preferred embodiment, links 246 are relatively thin and are formed of a somewhat resilient or springy material such as stainless steel.

As the leading end of film container 12 is inserted into chamber 216, the side flanges 86 of end cap section 76, which extend outwardly from the sidewalls 32 of film container 12, engage and spread apart or stress links 246 causing the leading ends 264 of links 246 to move slightly toward its associated loading tray sidewall 234. This provides the necessary lateral clearance for locating the film container 12 at its partially inserted position shown in FIG. 8 with its leading end bearing against loading tray wall 222. After the flanges 86 pass by the leading edges 270 of links 246, the links 246 snap back to their unstressed condition to position the leading edges 270 thereof in alignment with the trailing edges of end cap flanges 86.

In operation, handle 256, located in the door open position, is rotated clockwise (as viewed in FIGS. 8 and 9) about pivot 219 causing door 218 to rotate in a clockwise manner about the same pivots 219 toward its closed position. Shaft 250, being fixed to the door 218, also rotates in a clockwise manner about pivots 219 causing links 242 to advance forwardly into chamber 219.

The leading edges 270 of links 246 bear against end cap flanges 86 and push the film container 12 forwardly. The leading end of container 12, bearing against loading tray forward wall 222, pushes tray 224 forwardly until its is stopped at the fully inserted operative position by stop 244.

During this first part of the forward motion of links 246, the pins 266 on the loading tray walls 234 extend through the leading ends of slots 268. Because links 246 move the container 12 forward, and the container 12 moves tray 224 forward with it, there is no relative motion of the leading ends 264 of links 246 with respect to the tray sidewalls 234.

After the tray 224 and container 12 reach the fully inserted position, wherein container 12 is supported by support means (the aperture plate and springs 236 and 238) at its stationary operative position, further rotation of door 218 towards its closed position causes the links 246 to move further forwardly and relative to sidewalls 234 of tray 224. This further forward motion is permitted by slots 268. The links 246 slide forwardly relative to guide pins 266 so that the leading edges 270 of links 246 apply a force end cap flanges 86 and cause the end cap section 76 to rotate in a clockwise direction to its open position.

In a preferred embodiment, the undersides of leading ends 264 of links 246 are rounded so that they act as camming surfaces which the end cap flanges 86 follow to move and hold end cap section 76 in its fully open position shown in FIG. 9.

After each of the film units 16 has been exposed and advanced through rollers 228 and 230 in a manner described earlier in the disclosure, handle 256 is rotated in a counter clockwise direction about pivot 219 to move door 218 to its open position. In response to opening door 218, links 246 slide rearwardly relative to pins 266 until pins 266 are at the leading end of slots 268 thereby providing a static connection between links 246 and loading tray sidewalls 234. Further rearward motion of the links 246 causes them to pull tray 224 rearwardly to its retracted position of FIG. 8 thereby moving the trailing end of film container 12 out of chamber 216 when it may be grasped by the user for removal.

As shown in FIG. 8, a spring 272 mounted on one of the pivots 219 and bearing against a stop 274 on door sidewall 252 may be provided for spring biasing door 218 toward its closed position. This is one method of maintaining door 218 in its closed position. Alternatively, a latch may be employed to provide the same function.

As described above, camera 200 is a photographic apparatus including means for supporting a film container, having an end cap on a film withdrawal slot therein, at an operative position within the apparatus and a mechanism for moving the end cap from a closed position to an open position. In describing camera 200 in more detail, the end cap opening mechanism (links 246) are mounted for movement relative to the film container, located at a stationary operative position, for moving the end cap from the closed position to the open position. When links 246 are coupled to door 218, camera 200 includes means for opening the end cap in response to moving an access door (218) from its open position to its closed position.

Camera 200 further includes means (tray 224) which cooperate with links 246 for moving a film container, partially inserted into a receiving chamber within the camera, into its fully inserted operative position in response to closing door 218. Provisions are also made for at least partially extracting the film container in response to opening door 218.

One skilled in the art will recognize that it is within the scope of the invention to eliminate the film container insertion and extracting function embodied in tray 224. The film container may be manually inserted into and extracted from chamber 216. By properly selecting the length of links 246 they may be designed to perform the sole function of opening the end cap on a film container 12 that has been manually inserted into its operative position in chamber 216.

Figure 12:
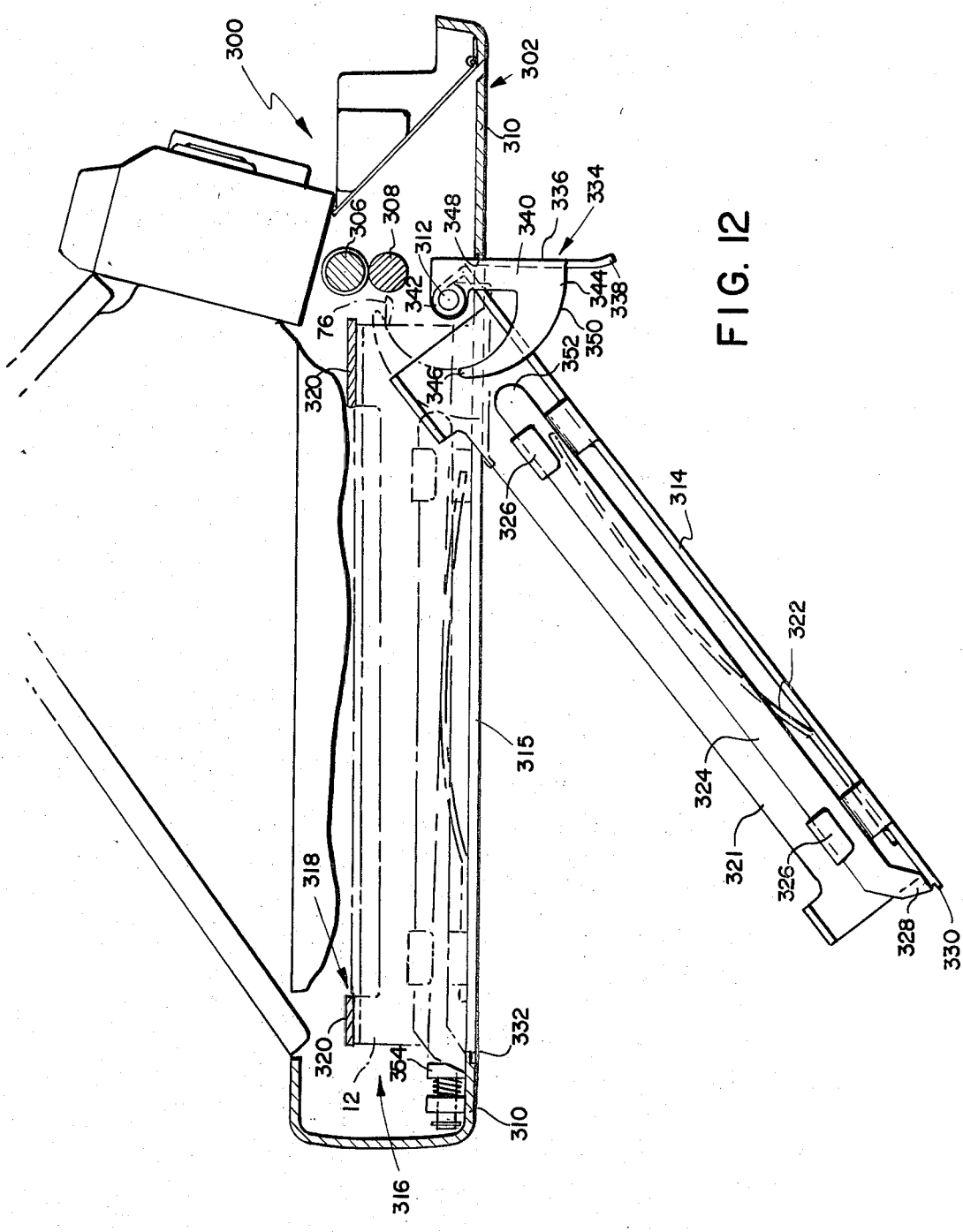
FIG. 12 is an elevational view, partly in section, of another alternative embodiment of a camera embodying the instant invention and having a bottom loading door and end cap opening member shown in their respective inoperative positions in solid lines and operative positions in dotted lines.

Another alternative embodiment of a photographic apparatus having means therein which is movable relative to a stationary film container 12 for moving the end cap section 76 from the closed position to the open position takes the form of a folding, single lens reflex, self-developing camera 300 shown in FIG. 12 of the drawings.

The upper housing sections and bellows of camera 300 are similar to those on camera 200 and will not be described again.

The lower or base housing section 302 of camera 300 includes a chamber 316 for receiving a film container 12 at an operative position therein. A pair of pressure applying rollers 306 and 308 are mounted in a forward portion of housing section 302.

Camera 300 is a "bottom" loading camera, i.e., a horizontal bottom wall 310 of housing 302 has a pivotally mounted (on a shaft 312 mounted in housing section 302 below rollers 306 and 308) door 314 which is movable between the open position shown in FIG. 12 (in solid lines wherein door 314 is pivoted downwardly to expose an opening 315 in bottom wall 310) providing access for loading a film container 12 into receiving chamber 316 and a closed position shown in FIG. 12 (in dotted lines).

In one embodiment, appropriate stops and locating members (not shown) are provided in chamber 316 for locating the exposure aperture 26 in the forward wall 22 of film container 12 in alignment with an aperture 318 in an aperture plate 320 in housing section 302. When film container 12 is located at its operative or exposure position within camera 300, the forward wall 22 of the film container 12 is adapted to be urged against aperture plate 320 to locate the forwardmost film unit 16 in container 12 at the camer's exposure plane after the dark slide 14 has been removed in the manner previously described.

In order to urge film container 12 towards aperture plate 320, a leaf spring 322 is provided on door 314 for engaging the rear wall 30 of the film container 12 when door 314 is in its closed position.

In the embodiment just described, the film container 12 is first inserted into chamber 316 through opening 315 and then door 314 is closed. Alternatively, and preferably, appropriate structure such as a pair of laterally spaced, upstanding support plates 321 may be provided on the interior of door 314 for receiving and releasably holding the film container 12. After the film container is releasably mounted on door 314 it may be closed to locate the film container 12 at its operative position within chamber 316.

In order to latch door 314 in its closed position, an elongated latching bar 324 is slidably mounted on a pair of upstanding guide members 326 along one lateral edge of door 314. In its normal unlatched position (shown in solid lines when door 314 is open) the trailing end 328 of latching bar 324 is positioned over but not beyond the trailing edge 330 of door 314 so that door 314 may close without the trailing end 328 of latching bar 324 hitting edge 332 of bottom wall 310 when door 314 is closed.

After door 314 is closed, latching bar 324 is moved rearwardly (to the left as viewed in FIG. 12) so that trailing end 328 of the latching bar rests on the bottom wall 310 over trailing edge 332 thereby latching door 314 by preventing its counter clockwise rotation about pivot 312.

Camera 300 is equipped with means for moving the end cap section 76 from its closed position to its open position after film container 12 has been located at its stationary operative position in chamber 316. In a preferred embodiment, the end cap moving means takes the form of a member 334 pivotally mounted on a shaft 312 with door 314 for movement between a first or inoperative position shown in FIG. 12 (in solid lines) and a second or operative position shown in FIG. 12 (in dotted lines). Member 334 also serves as means for moving the latching bar 324 from its normal position to its latching position.

Member 334 includes a plate-like base member 336 having a depending and slightly downwardly curved extension or handle 338 thereon. The base plate 336 is dimensioned to extend across housing section 302 for a distance that is slightly wider than the width of a film container 12.

Upstanding from the lateral edges of base plate 336 are a pair of laterally spaced flanges 340 (only one is shown) each including an opening 342 for receiving shaft 312 and a crescent shaped projection 344 terminating in a free end 346. Appropriate spaced and aligned slots 348 are provided in door 314 and bottom wall 310 of housing 302 to allow member 334 (especially flanges 340) to move between its operative and inoperative positions.

Projections 344 are spaced so that when they are rotated in a clockwise manner about shaft 312 (after door 314 is closed) into chamber 316 in housing section 302, they are just outside of the leading ends of sidewalls 32 of a film container 12 located at its operative position therein.

As projections 344 approach their operative position (shown in dotted lines in FIG. 12), their free ends 346 engage the portions 86 of end cap section 76 that extend outwardly from the sidewalls 32 of the film container 12. Further clockwise rotation of member 334 causes the ends 346 to apply a force to the end cap portions 86 that result in the end cap section 76 being rotated in a clockwise direction from the closed position to the open position. It will be noted that the curved undersides of projections 344 near ends 346 act as camming surfaces, which portions 86 follow, for moving and holding end cap 76 in its open position.

Thus camera 300 includes means mounted on the camera for movement relative to a film container, located at a stationary position within the camera, for moving an end cap on the film container from its closed position to an open position.

It was noted earlier that member 334 also moves the latching bar 324 from its normal position to its latching position.

The crescent projection 344 on the same side of door 314 as the latching bar 324 includes an outside curved edge 350 that engages a rounded end 352 of bar 324 as member 334 is rotated from the inoperative position to the operative position. Edge 350 serves as a camming surface which rounded end 352 follows causing bar 324 to slide to the left (as viewed in FIG. 12) to move the bar 324 from its normal position to its latching position in response to moving member 334 to its operative position.

It will be noted that end 328 engages a spring biased stop 354 mounted on the bottom wall 310 of housing section 302 (to the left of bottom wall edge 332) causing the spring to compress as the bar 324 moves towards its latching position. When member 334 is pivoted downwardly to its inoperative position, edge 350 disengages from rounded end 352 and the spring biased stop 354 urges latching bar 324 to the right to move it from its latching position to its normal position thereby allowing door 314 to be opened.

Thus it may be stated that camera 300 includes an open ended chamber for receiving film container 12, an access or loading door 314 movable between open and closed positions relative to the open end of the chamber, means for latching the door in its closed position and means responsive to latching the door for moving an end cap on the film container from its closed position to its open position.

It will be understood that it is within the scope of the invention to provide a movable member on the camera whose sole function is to engage and open the end cap on a stationary film container within the camera without providing an auxiliary function such as latching the access door.

The cameras 102, 200, and 300 have only been described briefly to explain the operating environment for the end cap opening mechanisms. A more detailed description of the general type of self-developing camera which cameras 102, 200, and 300 represent may be found in the previously mentioned copending application, Ser. No. 102,775, filed on Dec. 30, 1970 (now U.S. Pat. No. 3,643,565) and U.S. Pat. Nos. 3,722,389; 3,714,879; and 3,709,131.

Also, while camera 102 was shown to include a static member which the film container is moved relative to for opening the end cap and cameras 200 and 300 include end cap opening mechanisms which are mounted for movement relative to a film container located at a fixed position in the camera, it will be understood that it is within the scope of the present invention to employ either type (static or dynamic) of end cap opening mechanism to any of the illustrated cameras whether they be of the front loading (camera 102), rear loading (camera 200), or bottom loading (camera 300) type.

Since certain changes may be made in the above film assemblage and photographic apparatus without departing from the scope of the invention herein involved, it is intended that all matter contained in the above description or shown in the accompanying drawings shall be interpreted as illustrative and not in a limiting sense.

What is claimed is:

1. Photographic apparatus for use with a photographic film assemblage of the type including a film container housing at least one film unit and having a withdrawal slot at one end thereof through which the film unit may be extracted from the container and an end cap coupled to the container for movement between an initial closed position in which the end cap is in alignment with and in closing relation to the withdrawal slot and an open position in which the end cap is out of alignment with the withdrawal slot, the end cap being configured to include a portion extending outwardly from the container when the end cap is located in the initial closed position, said photographic apparatus comprising:

a housing;

means defining a fixed exposure position within said housing wherein such a film container is adapted to be located to expose film units held in the film container;

means associated with said housing for receiving and supporting such a film container at said fixed exposure position with the end cap on the film container located in the initial closed position; and means mounted on said housing for movement relative to such a film container supported at said fixed exposure position for engaging the portion of the end cap extending outwardly from the film container and moving the end cap from the initial closed position to the open position.

2. Photographic apparatus for use with a photographic film assemblage of the type including a film container housing at least one film unit and having a withdrawal slot at one end thereof through which the film unit may be extracted from the container and an end cap coupled to the container for movement between a closed position in which the end cap is in alignment with and in closing relation to the withdrawal slot and an open position in which the end cap is out of alignment with the withdrawal slot, the end cap being configured to include a portion extending outwardly from the container, said photographic apparatus comprising:

a housing;

means defining an open ended chamber within said housing for receiving and supporting such film container at an operative position within said chamber;

a door coupled to said housing for movement between an open position wherein said door is out of alignment with said open end of said chamber to allow such a film container to be inserted through said open end and into said chamber and a closed position wherein said door is in closing relation to said open end; and means responsive to moving said door from said open position to said closed position for engaging the portion of the end cap extending outwardly from such a film container located in said chamber and for moving the end cap from the closed position to the open position.

3. Photographic apparatus for use with a photographic film assemblage of the type including a film container housing at least one film unit and having a withdrawal slot at one end thereof through which the film unit may be extracted from the container and an end cap coupled to the container for movement between a closed position in which the end cap is in alignment with and in closing relation to the withdrawal slot and an open position in which the end cap is out of alignment with the withdrawal slot, the end cap being configured to include a portion extending outwardly from the container, said photographic apparatus comprising:

a housing;

means defining an open ended chamber within said housing for receiving and supporting such a film container at an operative position within said chamber;

a door coupled to said housing for movement between an open position wherein said door is out of alignment with said open end of said chamber to allow such a film container to be inserted through said open end and into said chamber and a closed position wherein said door is in closing relation to said open end;

latching means movable between an unlatching position and a latching position for latching said door in its said closed position; and means responsive to moving said latching means from said unlatching position to said latching position for engaging the portion of the end cap extending outwardly from such a film container located in said chamber and moving the end cap from the closed position to the open position.

4. A photographic camera for use with a photographic film assemblage of the type including a film container housing at least one film unit, the film container being of the type including an exposure aperture therein, through which light is adapted to be transmitted to expose such a film unit held in the container, and a film unit withdrawal slot at one end of the film container through which the film unit is adapted to be advanced to withdraw the film unit from the film container subsequent to exposure, such a film assemblage also including an end cap coupled to the one end of the film container for movement from an initial closed position wherein the end cap is in alignment with and closing relation to the film withdrawal slot and an open position wherein the end cap is out of alignment with the film withdrawal slot and a path of travel of a film unit being advanced therethrough, the end cap being of the type including a portion thereof that extends outwardly from the film container when the end cap is located in its initial closed position, said camera comprising:

a housing;

means defining an exposure position within said housing wherein the film container is adapted to be located so that a film unit held in the film container is in position to be exposed to light transmitted through the exposure aperture in the film container;

means within said housing for receiving such a film container and for supporting the film container at said exposure position with the end cap located in the initial closed position;

exposure means mounted on said housing for exposing a film unit held in such film container supported at said exposure position; and means mounted on said housing for engaging the portion of the end cap located in its initial closed position and extending outwardly from such a film container supported at said exposure position by said support means and for moving the end cap from the initial closed position to the open position such that the film unit may be advanced through the withdrawal slot, subsequent to exposure through the exposure aperture.

5. A photographic camera as defined in claim 4 further including means for holding the end cap in the open position wherein it is out of alignment with the film withdrawal slot and the film unit path of travel so that the film unit may be advanced along the path of travel, subsequent to exposure, without contacting the end cap.

6. A photographic camera as defined in claim 5 wherein said means for holding the end cap in the open position forms an integral part of said means for engaging and moving the end cap from the initial closed position to the open position.

7. A photographic camera as defined in claim 4 wherein said means for engaging and moving the end cap is operative to automatically engage and move the end cap from the initial closed position to the open position in response to preparing said camera for operation.

8. A photographic camera as defined in claim 4 wherein said means for engaging and moving the end cap is manually operative to engage and move the end cap from the initial closed position to the open position.

9. A photographic camera as defined in claim 4 wherein the film unit held in such a film container includes an integral supply of processing fluid that is adapted to be distributed within the film unit by the application of a compressive pressure to the film unit subsequent to exposure and advancement of the film unit through the film withdrawal slot and said camera further includes processing means for receiving a film unit advanced through the withdrawal slot and for applying a compressive pressure thereto to effect the distribution of the processing fluid within the film unit, said processing means being mounted on said housing so as to be in alignment with the film withdrawal slot at the one end of the container supported at said exposure position, said processing means being spaced from the one end of the container a sufficient distance to allow displacement of the end cap from the initial closed position to the open position between the one end of the film container and said processing means.

10. A photographic camera as defined in claim 4 wherein said means for engaging and moving the end cap includes a member mounted for movement along a predetermined path within said housing for engaging the end cap located in said path of travel when the film container is supported at said exposure position by said support means and for moving the end cap from the initial closed position to the open position.

11. A photographic camera for use with a photographic film assemblage of the type including a film container housing at least one film unit, the film container being of the type including an exposure aperture therein, through which light is adapted to be transmitted to expose such a film unit held in the container, and a film unit withdrawal slot at one end of the film container through which the film unit is adapted to be advanced to withdraw the film unit from the film container subsequent to exposure, such a film assemblage also including an end cap coupled to the one end of the film container for movement from an initial closed position wherein the end cap is in alignment with and closing relation to the film withdrawal slot and an open position wherein the end cap is out of alignment with the film withdrawal slot and a path of travel of a film unit being advanced therethrough, the end cap being of the type including a portion thereof that extends outwardly from the film container when the end cap is located in its initial closed position, said camera comprising:

a housing;
means defining an open ended chamber within said housing for receiving such a film container;
means defining an exposure position within said chamber at which such a film container is adapted to be located such that a film unit held in the film container may be exposed through the exposure aperture;
means for supporting such a film container at said exposure position with the end cap on the container located in the initial closed position;
exposure means mounted on said housing for exposing a film unit held in such a film container supported at said exposure position;
a door coupled to said housing for movement between an open position wherein said door is out of alignment with said open end of said chamber to allow such a film container to be inserted through said open end and into said chamber and a closed position wherein said door is in closing relation to said open end; and
means responsive to moving said door from said open position to said closed position for engaging the portion of the end cap extending outwardly from such a film container located in said chamber at said exposure position and for moving the end cap from the initial closed position to the open position.

12. A photographic camera as defined in claim 10 further including means for holding the end cap in the open position wherein the end cap is out of alignment with the film withdrawal slot and the film unit path of travel to prevent contact between the film unit and the end cap as the film unit is advanced along the path of travel.

13. A photographic camera as defined in claim 11 wherein said means for holding said end cap in the open position forms an integral part of said means for engaging and moving the end cap.

14. A photographic camera for use with a photographic film assemblage of the type including a film container housing at least one film unit, the film container being of the type including an exposure aperture therein, through which light is adapted to be transmitted to expose such a film unit held in the container, and a film unit withdrawal slot at one end of the film container through which the film unit is adapted to be advanced to withdraw the film unit from the film container subsequent to exposure, such a film assemblage also including an end cap coupled to the one end of the film container for movement from an initial closed position wherein the end cap is in alignment with and closing relation to the film withdrawal slot and an open position wherein the end cap is out of alignment with the film withdrawal slot and a path of travel of a film unit being advanced therethrough, the end cap being of the type including a portion thereof that extends outwardly from the film container when the end cap is located in its initial closed position, said camera comprising:

a housing;
means defining an open ended chamber in said housing for receiving such a film container;
means defining an exposure position within said chamber wherein such a film container is adapted to be positioned to locate a film unit held in the film container in position for exposure through the exposure aperture;
means for supporting such a film container at said exposure position with the end cap on the film container located in the initial closed position;
exposure means on said housing for exposing a film unit held in such a film container supported at said exposure position;

a door coupled to said housing for movement between an open position wherein said door is out of alignment with said open end of said chamber to allow such a film container to be inserted through said open end and into said chamber and a closed position wherein said door is in closing relation to said open end;

latching means movable between an unlatching position and a latching position for latching said door in its said closed position; and means responsive to moving said latching means from said unlatching position to said latching position for engaging the portion of the end cap extending outwardly from such a film container located in said chamber at said exposure position and moving the end cap from the initial closed position to the open position.

15. A photographic camera as defined in claim 13 further including means for holding the end cap in the open position to prevent contact between the end cap and the film unit as the film unit is advanced through the film withdrawal slot and along the film unit path of travel.

16. A photographic camera as defined in claim 14 wherein said means for holding the end cap in the open position forms an integral part of said means for engaging and moving the end cap from the initial closed position to the open position.

17. Photographic camera apparatus for use with a photographic film assemblage of the type including a film container, having an exposure aperture, and at least one film unit initially retained within the film container, the film container further having a withdrawal slot at one end thereof through which the film unit may be advanced from the film container after its exposure through the film container's exposure aperture, the film assemblage additionally including an end cap disposed in an initial closing relationship to the withdrawal slot and having a portion thereof extending outwardly from the film container, said photographic apparatus comprising:

a housing defining an exposure plane therewithin;

means associated with said housing for receiving and supporting the film assemblage so that the film unit may be positioned at said exposure plane in operative relationship with the film container's exposure aperture while disposed within the film container;

means mounted on said housing for engaging the portion of the end cap extending outwardly from the film container and for effecting the displacement of the end cap from its initially closing position; and means for advancing the film unit through the film container's withdrawal slot after both the exposure thereof and the displacement of the end cap from its initially closing position.

* * * * *